United States Patent [19]

Fischbeck et al.

[11] 4,057,807

[45] Nov. 8, 1977

[54] SEPARABLE LIQUID DROPLET INSTRUMENT AND MAGNETIC DRIVERS THEREFOR

[75] Inventors: Kenneth H. Fischbeck, Dallas; Richard H. Vernon, Richardson, both of Tex.

[73] Assignee: Xerox Corporation, Stamford, Conn.

[21] Appl. No.: 649,187

[22] Filed: Jan. 15, 1976

[51] Int. Cl.[2] .............................................. G01D 15/18

[52] U.S. Cl. .............................................. 346/140 R

[58] Field of Search ............... 222/200, 209, 214, 330, 222/383, 420; 346/75, 140

[56] References Cited

U.S. PATENT DOCUMENTS

| | | | |
|---|---|---|---|
| 3,747,120 | 7/1973 | Stemme | 346/140 X |
| 3,832,579 | 8/1974 | Arndt | 346/140 X |
| 3,848,118 | 11/1974 | Rittberg | 346/75 X |
| 3,864,685 | 2/1975 | Fischbeck | 346/75 X |
| 3,924,974 | 12/1975 | Fischbeck et al. | 346/75 X |
| 3,946,398 | 3/1976 | Kyser | 346/75 X |

FOREIGN PATENT DOCUMENTS

| | | | |
|---|---|---|---|
| 2,256,667 | 6/1974 | Germany | 346/75 |

OTHER PUBLICATIONS

Helinski, E. F., Ferrofluid Amplifier Valve, IBM Technical Disclosure Bulletin, June 1974, vol. 17, No. 1, pp.75–76.

*Primary Examiner*—George H. Miller, Jr.
*Attorney, Agent, or Firm*—Sheldon F. Raizes

[57] ABSTRACT

An ink jet assembly comprises a magnetic driver and a liquid droplet instrument. The driver includes a plurality of magnets, which may be selectively energized. The instrument includes a diaphragm means, which forms an outer wall of each of a plurality of chambers and when exposed to a magnetic field, deforms to decrease the volume of a chamber to increase the pressure therein to express a liquid droplet therefrom. The driver and instrument are releasably secured to each other to permit replacement of the instrument without disposing the driver.

10 Claims, 7 Drawing Figures

FIG. 1
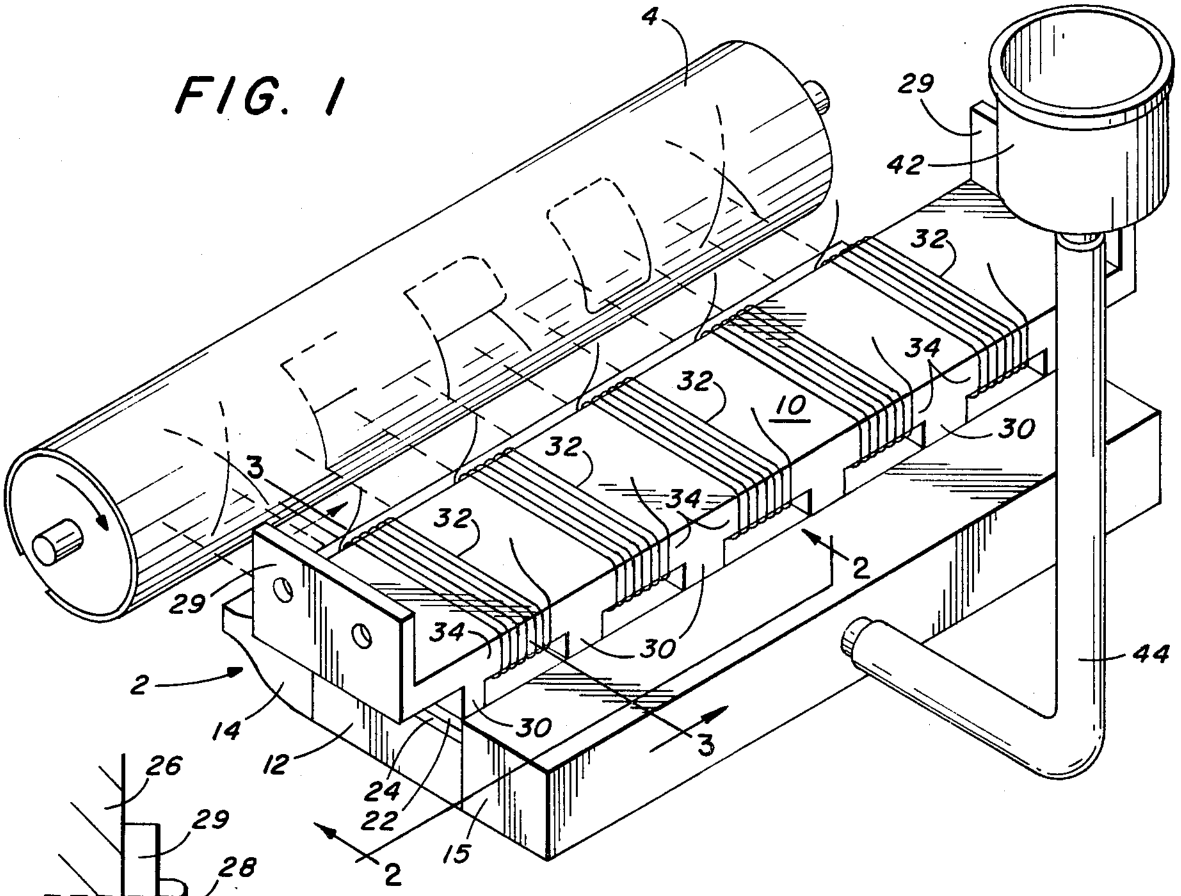
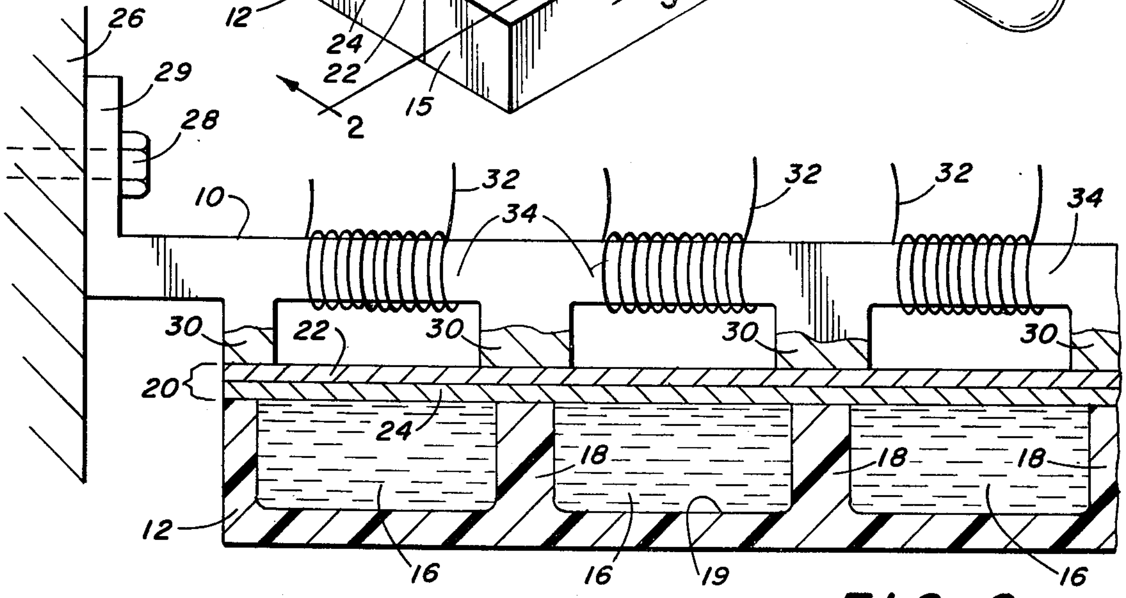
FIG. 2
FIG. 3
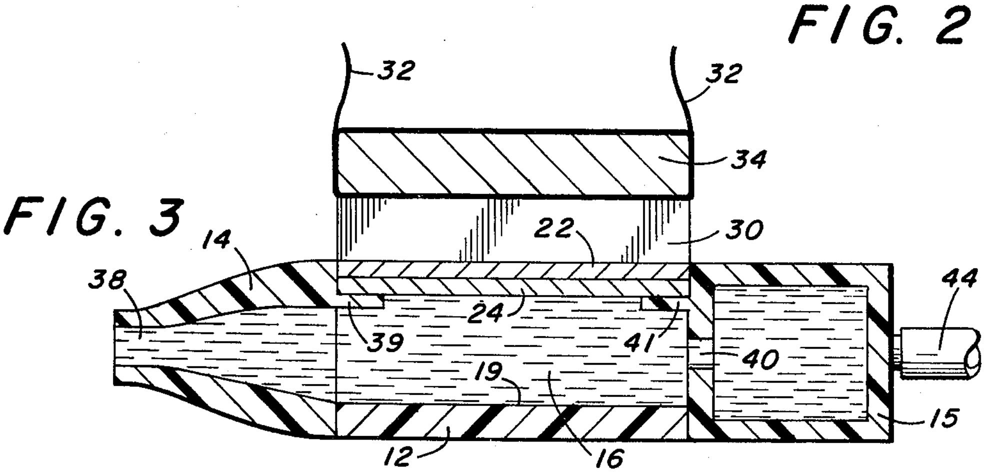

SEPARABLE LIQUID DROPLET INSTRUMENT AND MAGNETIC DRIVERS THEREFOR

DESCRIPTION OF THE INVENTION

In an ink jet assembly wherein ink droplets are expressed from a chamber by selectively increasing the pressure therein, the means for increasing the pressure in the chamber may be piezo-electric or magnetostrictive actuators. The actuators are normally permanently secured to the ink jet assembly requiring new actuators each time an assembly must be replaced. The actuators comprise a substantial proportion of the cost of the assembly. Therefore, if the actuators are reusable so they may be used with replacement assemblies, a substantial savings can be achieved.

It is, therefore, an object of this invention to provide an ink jet assembly, wherein magnetic driver means are releasably attached to a liquid droplet expression instrument so the instrument can be replaced with a new instrument while still employing the same magnetic drivers.

It is a further object to provide a simply constructed liquid droplet expression instrument, which is releasably secured to magnetic driver means.

It is yet a further object of this invention to construct an assembly in accordance with the above objects which is specifically adapted for ink jet applications.

Other objects of the invention will become apparent from the following description with reference to the drawings wherein:

FIG. 1 is a perspective view of a multiple ink jet printing system;

FIG. 2 is a view taken along section line 2—2 of FIG. 1;

FIG. 3 is a view taken along section line 3—3 of FIG. 1;

Figure 4:
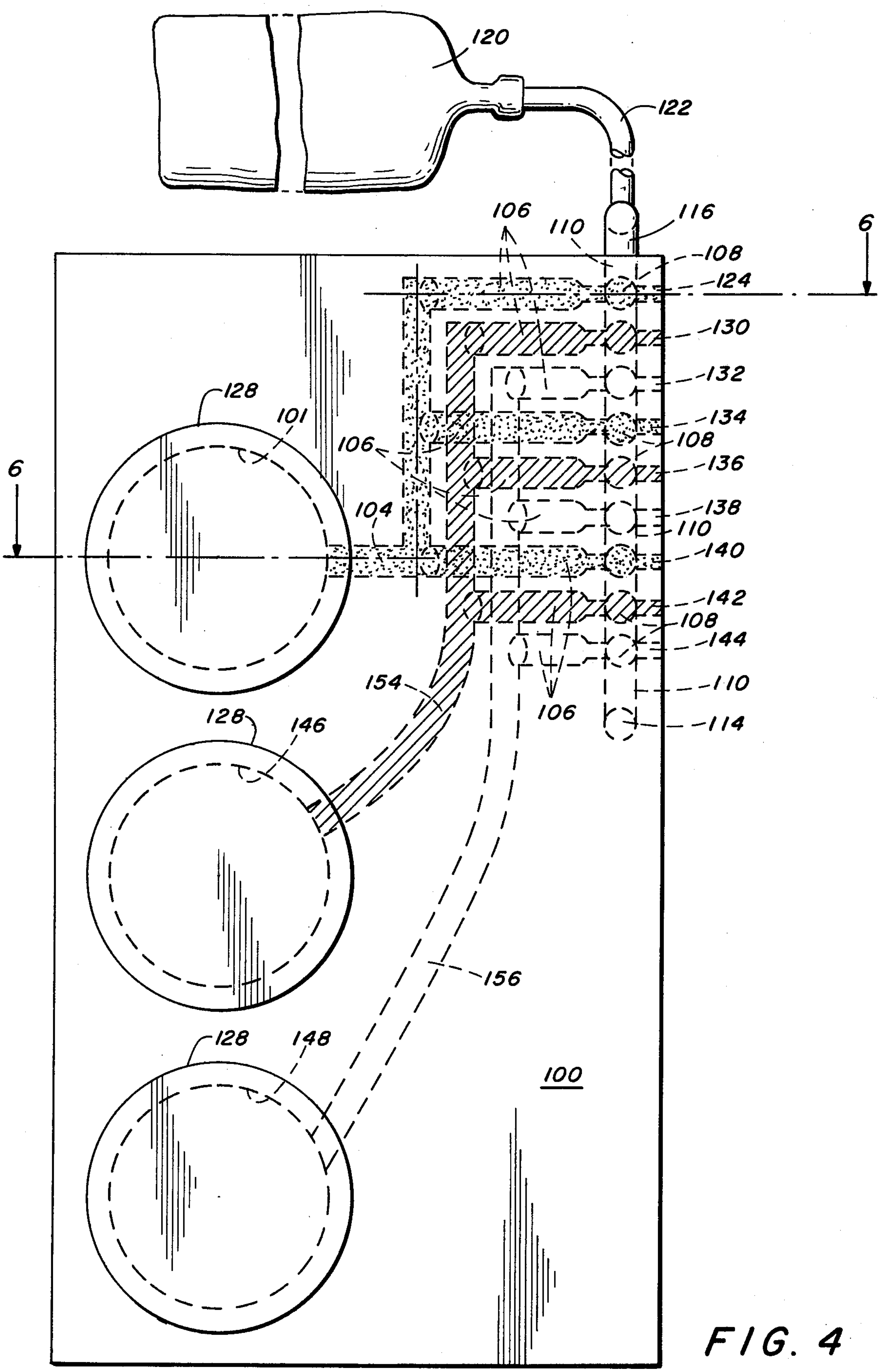
FIG. 4 is a top view of a coincidence ink jet unit.

Referring to FIGS. 1-3, a multiple liquid droplet or ink jet instrument unit 2 is arranged opposite a rotating recording medium 4 for depositing ink droplets thereon. A magnetic driver bar 10 is releasably secured to the ink jet instrument unit 2. The instrument 2 comprises an elongated plastic or ceramic chamber unit 12, a plastic or ceramic multiple nozzle unit 14 attached to the front of the chamber unit 12 and a plastic or ceramic manifold reservoir unit 15 attached to the rear of the chamber unit. The chamber unit has a plurality of chambers 16 separated by side walls 18 projecting upwards from a bottom wall 19. An elastic diaphragm 20 spans the chamber body and is sealed to the upper edge of each wall 18 to form an outer wall of the chamber body. The diaphragm 20 comprises two laminated layers 22, 24 of different materials, which have significantly different strain characteristics in the presence of a magnetic field, resulting in buckling of the diaphragm when such a field is applied thereto. An example of two such materials is nickel for layer 22 and an iron cobalt nickel alloy, such as Supermendur, for layer 24. The change in length, relative to its original length, is substantially greater for Supermendur than for nickel at any given magnetizing force. When buckling or deformation of the diaphragm occurs, the Supermendur layer will form the longest surface (convex surface) of the ribbon in the buckling direction and the nickel layer will form the shortest surface (concave surface) of the ribbon in the buckling direction.

The magnetic driver 10 is secured to a stationary support member 26 by bolts 28 which extend through longitudinally spaced flanges 29. The driver is made of a material which is highly permeable to magnetic fields but of low electrical conductivity to minimize eddy current losses. Such materials may comprise a class of materials known as ferrites. The driver 10 includes a plurality of legs 30, adjacent pairs of which embrace a respective chamber 16 to form horseshoe magnets. A plurality of electrically insulated conductors 32 are wrapped in a coil around a respective one of the sections 34 of the driver, which are located between each leg 30. The coiled conductors are connected to electrical drivers (not shown) so that each coil may be separately addressed. When current is passed through the coiled conductors 32, the magnetic field lines will be generated along the axis of the coil or in the longitudinal direction. The magnetic field lines will be isolated within a respective chamber area so only the corresponding diaphragm section is stressed when current is passed through a particular coil. The stress on the diaphragm 20 exerted by the magnetic field will be in a direction parallel to the direction of the magnetic field lines; thus in a longitudinal direction. Referring to FIG. 2, the stress exerted on the diaphragm will cause an unequal strain on layers 22 and 24 thereby effecting buckling of the diaphragm in the longitudinal direction with the convex or longest surface 24 thereof facing the interior of the chamber 16, resulting in decreasing the volume of the chamber to express an ink droplet therefrom.

The multiple nozzle unit 14 is of thin plastic wall construction and comprises a plurality of ink jet droplet orifices 38 separated by a wall therebetween. The nozzle unit has a plurality of spaced ledges 39 which are sealed to the front edge of the diaphragm 20. The nozzle unit is also sealed to the walls 18 and the bottom wall 19 with one orifice being communicated with one chamber.

The manifold ink reservoir unit 15 is also of thin plastic wall construction and has a plurality of spaced ledges 41 sealed to the back edge of the diaphragm 20. The reservoir unit 15 is also sealed to the walls 18 and the bottom wall 19 and is communicated to the individual chambers 16 through a plurality of orifices 40. The reservoir orifice 40 is more restrictive to flow from the chamber than the droplet orifice 38 whereupon pressure developed in the chamber 16, due to deformation of the diaphragm 20, will express a droplet from the nozzle orifice 38 rather than force fluid back to the reservoir through orifice 40. Upon relaxation of the diaphragm, fluid from the reservoir will replace the ink expressed from chamber 16. A primary reservoir 42 supplies the manifold reservoir through conduit 44 and may be kept at a pressure of about 6 inches of liquid.

The liquid droplet instrument 2 is releasably connected to the magnetic unit by magnetic attraction between the horseshoe magnets and the diaphragm 20. However, additional appropriate connecting means can also be provided for releasably securing the instrument to the magnetic driver unit. Thus, the instrument 2 may be removed from the driver 10 and replaced allowing the same driver to be used with a number of instruments. This saves the cost of providing new drivers for each new instrument.

In operation, current is selectively passed through the coiled conductors 32 of various selected chambers to cause deformation of the diaphragm 20 thereof to express ink droplets from the nozzle orifice 38 associated therewith to deposit ink droplets on the recording medium, in accordance with a desired image, as the recording medium 3 rotates therepast.

Referring to FIGS. 4–7, there is illustrated a coincidence liquid droplet or ink jet instrument to which the principle of this invention may also apply. A coincidence jet assembly is the subject matter of copending U.S. application, Ser. No. 625,988, filed Oct. 22, 1975, and entitled "Coincidence Ink Jet" (common assignee), and comprises two liquid ink pressure passages and a droplet outlet orifice. Each of the pressure passages is communicated to a respective pressure chamber. An ink droplet is expressed from the outlet orifice only when the liquid in both the pressure passages has a simultaneous increase in pressure.

Figure 6:
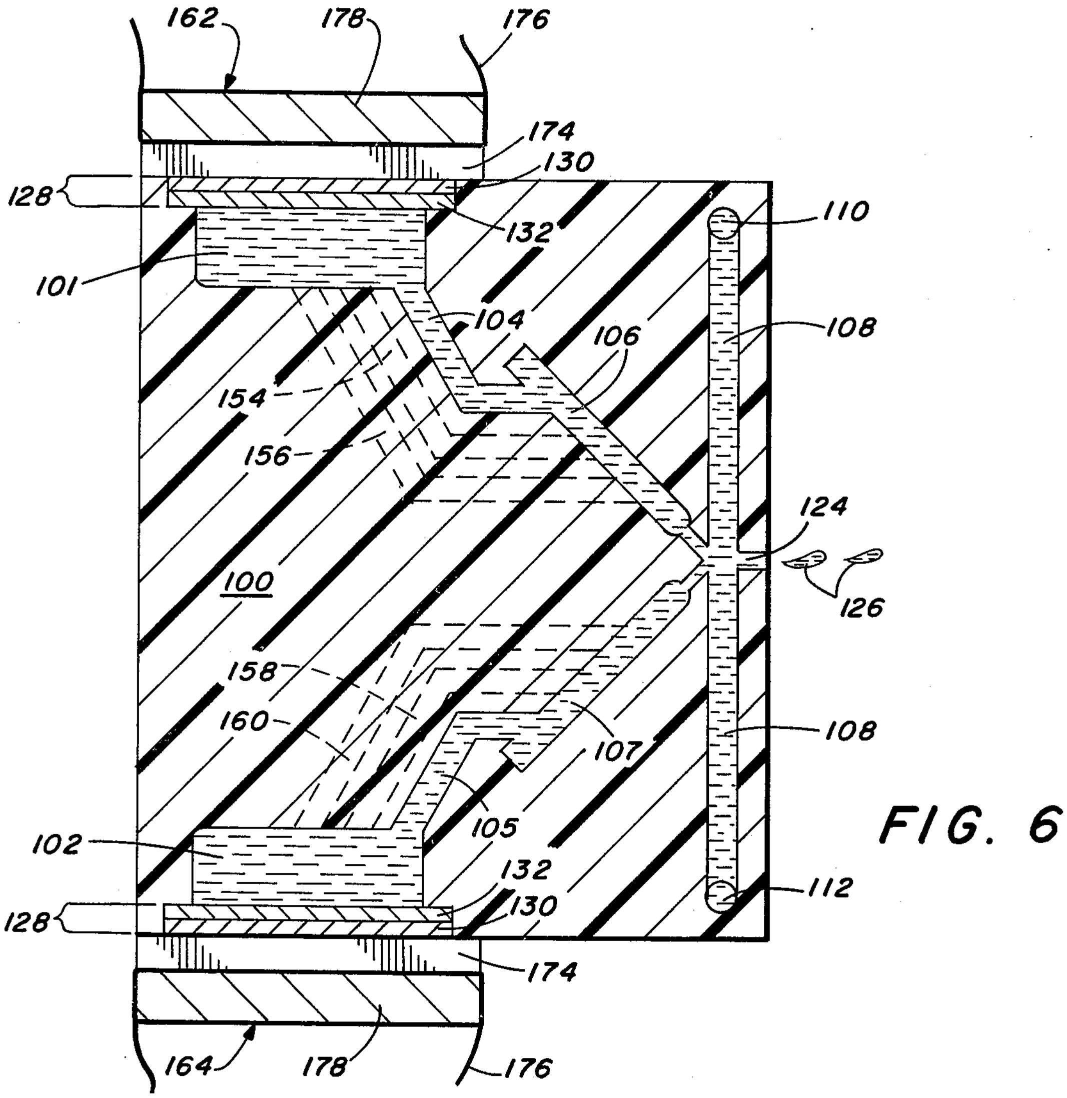
FIG. 6 is a view taken along section line 6—6 of FIG. 4.

Referring to FIG. 6, there is illustrated a section view of an ink jet instrument housing 100, which includes a pair of circular pressure chambers 101 and 102. Main fluid pressure passages 104 and 105 lead from the chambers 101, 102, respectively, to pressure inlet passages 106, 107, which lead to a liquid ink supply passage 108 where the three passages intersect. The liquid ink supply passage 108 branches off from two parallel main supply passages 110 and 112, which in turn are joined at one end inside the housing by a cross-passage 114 and at the other end by an external C-shaped tubular fitting 116. A flexible bag ink reservoir 120 is communicated to the tubular fitting 116 by a conduit 122. Also, at the intersection is an outlet orifice 124 through which ink droplets 126 are expressed onto a copy medium.

The chambers 101 and 102 are each sealed by an elastic diaphragm 128, which is secured to the housing 100 by an adhesive. The diaphragm comprises two laminated layers 130, 132, which are the same materials as layers 22 and 24, respectively, of diaphragm 20. The chambers and passages are entirely filled with liquid. When the diaphragm 128 for either chamber 101 or 102 is deformed, a pressure increase will occur in that particular chamber causing displacement of ink in a respective one of passages 106 and 107.

The relationship between the above-described chambers, passages and the droplet outlet orifice is now described for an understanding of a coincidence ink jet principle. The passages 106 and 107 are at such an angle relative to the orifice 124, the impedance to liquid flow in passage 108 relative to the impedance to liquid flow in orifice 124, and the magnitude and duration of a pressure increase exerted on the liquid in the pressure chambers 101, 102 are designed that the ink stream expressed from only one passage at a time will entirely miss orifice 124 and displace the ink in the ink supply passage 108 while the ink within orifice 124 will not be disturbed to the extent of expressing a droplet therethrough. The orifice 124 is so located relative to the intersection of the passages 106, 107 and the magnitude and duration of the pressure increase exerted on the liquid in the pressure chambers 101, 102 are so designed that the summation vector of the fluid momentum vectors in passages 106 and 107 will lie on the axis of the orifice 124. Thus, only when the diaphragm 128 for both pressure chambers 101, 102 is simultaneously deformed, thereby applying a simultaneous pressure increase in the liquid in each of passages 106, 107, will an ink droplet 126 be expressed from orifice 124.

Figure 5:
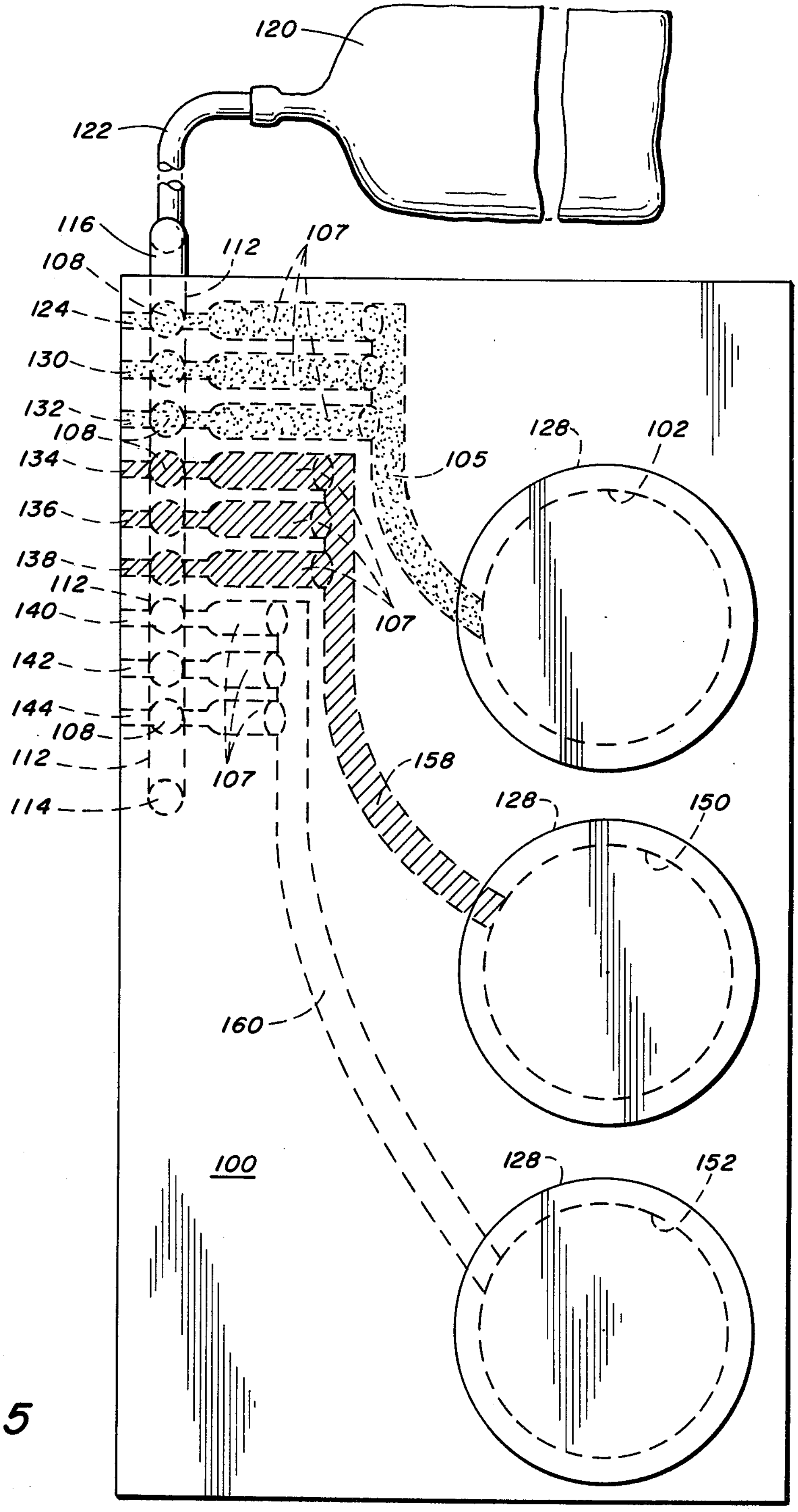
FIG. 5 is a bottom view of a coincident ink jet unit of FIG. 4.

The aforedescribed coincidence ink jet principle has specific utilization in a matrix actuation system where a large number of jets or a dense linear jet array is employed since substantially fewer pressure chambers than the number of jets utilized are required. Theoretically, since two independent pressure chambers are required to effect expression of an ink droplet through a jet, the number of pressure chambers required in a matrix actuation system is twice the square root of the number of jets. For example, theoretically, only 120 pressure chambers are needed for 3600 jets. Each jet orifice is communicated to two pressure chambers. However, as the number of jets increases in a system, the number of jets communicated to one pressure chamber will be hydraulically limited and, therefore, more pressure chambers may be required. For instance, the practical number of pressure chambers for a 3600-jet instrument may range between 120 and 400. In this instance, a housing would be provided with a plurality of pressure chambers, each serving a number of ink jets. A nine-jet, six-pressure chamber ink jet instrument is shown in FIGS. 4–7. Each orifice 130, 132, 134, 136, 138, 140, 142 and 144 has pressure inlet passages 106, 107 and a fluid supply passage 108 communicated to it in exactly the same manner as described for orifice 124. The pressure chambers 146, 148, 150 and 152 are the same as chambers 101 and 102 and each is sealed by an elastic diaphragm 128. For clarity, FIG. 4 illustrates fluid passages between only the chambers 101, 146 and 148 and their respective ink jet orifices; and FIG. 5 illustrates the fluid passages between only the chambers 102, 150 and 152 and their respective ink jet orifices. Also, some of the passages are cross-hatched and filled with dots for clarity in showing separate passages. Chamber 101 is communicated to the jets 124, 134 and 140 by main passage 104; chamber 146 is communicated to the jets 130, 136 and 142 by passage 154; and chamber 148 is communicated to jets 132, 138 and 142 by passage 156. Chamber 102 is communicated to jets 124, 130 and 132 by passage 105; chamber 150 is communicated to jets 134, 136 and 138 by passage 158; and chamber 152 is communicated to jets 140, 142 and 144 by passage 160. The following table shows which jets express droplets therefrom when particular chambers are pressurized:

| Chambers Simultaneously Pressurized | Droplet Expressed From Jet |
|---|---|
| 102, 101 | 124 |
| 102, 146 | 130 |
| 102, 148 | 132 |
| 150, 101 | 134 |
| 150, 146 | 136 |
| 150, 148 | 138 |
| 152, 101 | 140 |
| 152, 146 | 142 |
| 152, 148 | 144 |

Figure 7:
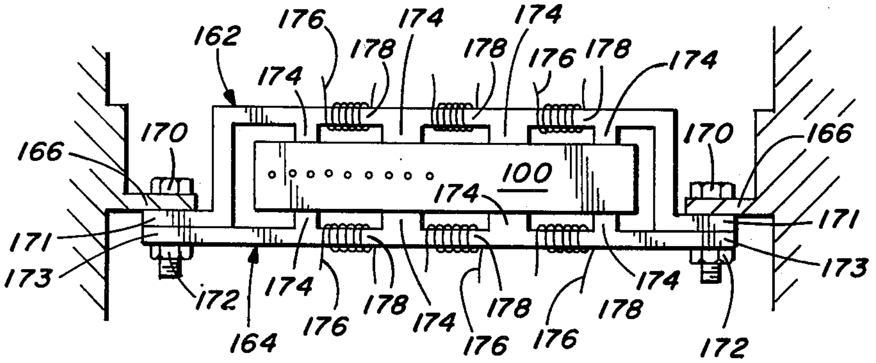
FIG. 7 is a front view of the unit of FIGS. 4–6 illustrating magnetic drivers releasably attached thereto.

Referring to FIGS. 6 and 7, a pair of magnetic drivers 162, 164 have flanges 166, 168, respectively, extending therefrom which are removably secured to a stationary support bracket 166 by a bolt 170 and a nut 172 assembly which extend through flanges 171 and 173 extending from the drivers 162 and 164, respectively. The drivers are of the same material as driver 10 and each comprises a bar with a plurality of legs 174 extending therefrom to form therewith a plurality of horseshoe magnets. The driver 162 has three horseshoe magnets disposed opposite a respective one of chambers 101, 146 and 148, and the driver 164 has three horseshoe magnets disposed opposite a respective one of chambers 102, 150 and 152. Electrically insulated conductors 176 are wrapped in a coil around a respective one of the sections 178 of the drivers. A plurality of electronic drivers are connected to a respective one of the coiled conductors to selectively pass current through the same. When an ink droplet is desired through a particular orifice, current is simultaneously passed through the coils corresponding to the particular two chambers which need to be pressurized to express a droplet through such orifice. When current is passed through a coiled conductor, magnetic field lines will be set up exerting a stress on a corresponding diaphragm 128. The stress exerted on the diaphragm will cause an unequal strain on layers 130 and 132 thereby effecting buckling of the diaphragm with the convex or largest surface facing the interior of the pressure chamber, resulting in decreasing the volume thereof and increasing the pressure therein. The liquid droplet instrument is sandwiched between the magnetic drivers 162 and 164 with the free ends of the legs 174 in contact with at least a portion of their respective diaphragms 128. When it is desired to replace the liquid droplet instrument with a new one, drivers 162 and 164 are removed from the support 166, housing 100 removed and replaced with a new one and the driver 164 resecured to the support 166. Thus, the drivers are usable with a number of liquid droplet instruments saving the cost of providing new drivers for each new instrument.

The diaphragm 20 for the embodiment of FIGS. 1–3 spans the entire chamber housing. There may be substituted therefor a plurality of diaphragms, one for each chamber. Similarly, a continuous diaphragm web may span the housing 100 to seal chambers 101, 146 and 148 and another continuous diaphragm web may seal the chambers 102, 150 and 152 rather than employing separate diaphragms 128 for each chamber in the embodiment of FIG. 4–7.

What is claimed is:

1. In a liquid drop generator comprising: a housing having a plurality of pressure chambers therein, said pressure chambers opening onto an outer surface of said housing and elastic diaphragm means sealing each chamber opening thereby forming an outer wall of a respective chamber; driver unit means having a plurality of members permeable to magnetic fields, said housing releasably secured to the driver unit means" each of said permeable members releasably engaging a portion of said elastic diaphragm means of a respective one of said chambers; means for selectively effecting a magnetic field in each of said permeable members; said elastic diaphragm means being so constructed and arranged to deform to decrease the volume of a respective chamber in response to said effected magnetic field.

2. The structure as recited in claim 1 wherein said diaphragm means comprises a plurality of separate diaphragm members, one for each chamber.

3. The structure as recited in claim 1 wherein said diaphragm means is a web spanning said chambers.

4. The structure as recited in claim 1 wherein said permeable members are horseshoe magnets, and said means for effecting a magnetic field in said permeable members includes electrically insulated conductors coiled around said horseshoe magnets.

5. The structure as recited in claim 1 wherein all of said pressure chambers open onto only one surface of said housing, and said driver unit means is located opposite said one surface.

6. The structure as recited in claim 5 further comprising a plurality of droplet outlet orifices, each communicated with a respective one of said pressure chambers.

7. The structure as recited in claim 1 wherein a group of said pressure chambers opens onto one surface of said housing, and another group of said pressure chambers opens onto another surface of said housing; a portion of said driver unit means being located opposite said one surface of said housing, and another portion of said driver unit means being located opposite said another surface of said housing.

8. The structure as recited in claim 7 further comprising a plurality of droplet outlet orifices, each of said pressure chambers being communicated to more than one of said orifices, the number of pressure chambers being fewer than the number of orifices.

9. In a liquid drop generator comprising: a housing having at least one pressure chamber therein, said pressure chamber opening onto an outer surface of said housing and elastic diaphragm means sealing said chamber opening thereby forming an outer wall thereof; driver unit means having at least one member permeable to magnetic fields, said housing releasably secured to the driver unit means said permeable member releasably engaging a portion of said elastic diaphragm means of said chamber; means for selectively effecting a magnetic field in said permeable member; said elastic diaphragm means being so constructed and arranged to deform to decrease the volume of said chamber in response to said effected magnetic field.

10. The structure as recited in claim 9 wherin said permeable member is a horseshoe magnet, and said means for effecting a magnetic field in said permeable member includes electrically insulated conductor coiled around said horseshoe magnet.

* * * * *